Figure 1:
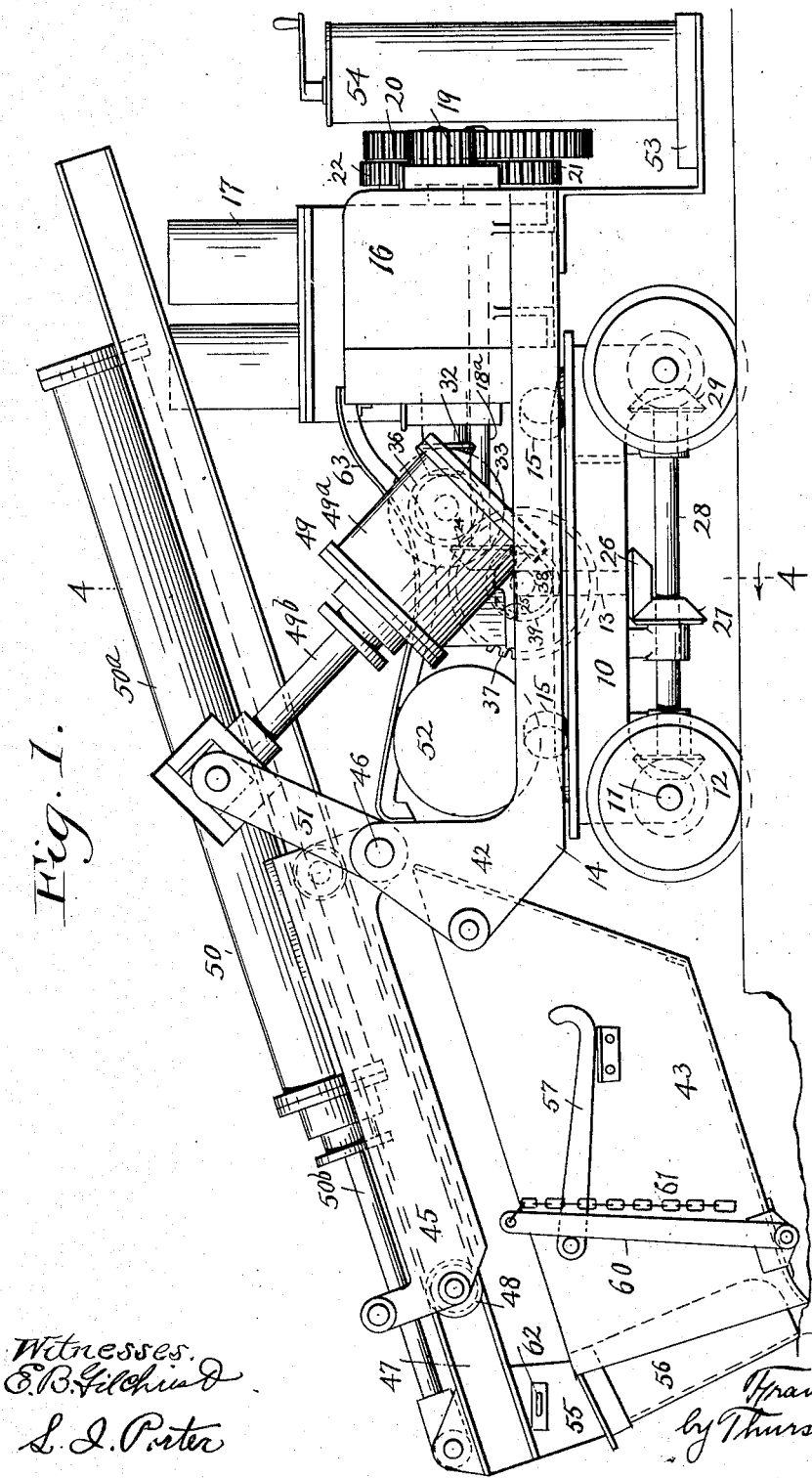

F. BILLINGS.
LOADING AND CONVEYING APPARATUS.
APPLICATION FILED JUNE 12, 1913.

1,300,111.

Patented Apr. 8, 1919.
5 SHEETS—SHEET 3.

F. BILLINGS.
LOADING AND CONVEYING APPARATUS.
APPLICATION FILED JUNE 12, 1913.

1,300,111.

Patented Apr. 8, 1919.
5 SHEETS—SHEET 4.

Witnesses
E. B. Gilchrist
L. I. Porter

Inventor
Frank Billings
by Thurston & Kwis
Attys.

F. BILLINGS.
LOADING AND CONVEYING APPARATUS.
APPLICATION FILED JUNE 12, 1913.
1,300,111.
Patented Apr. 8, 1919.
5 SHEETS—SHEET 5.
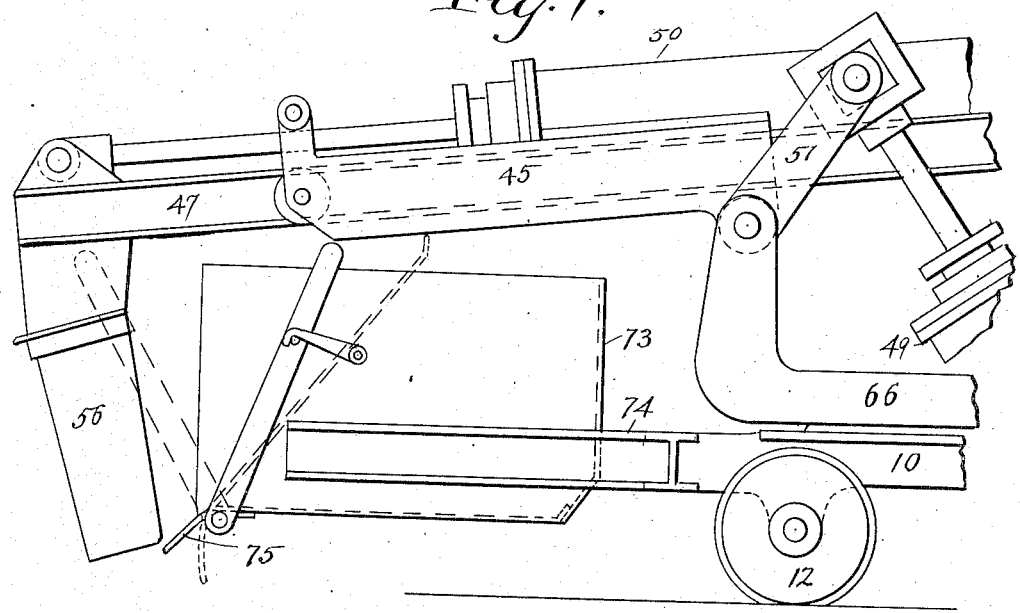
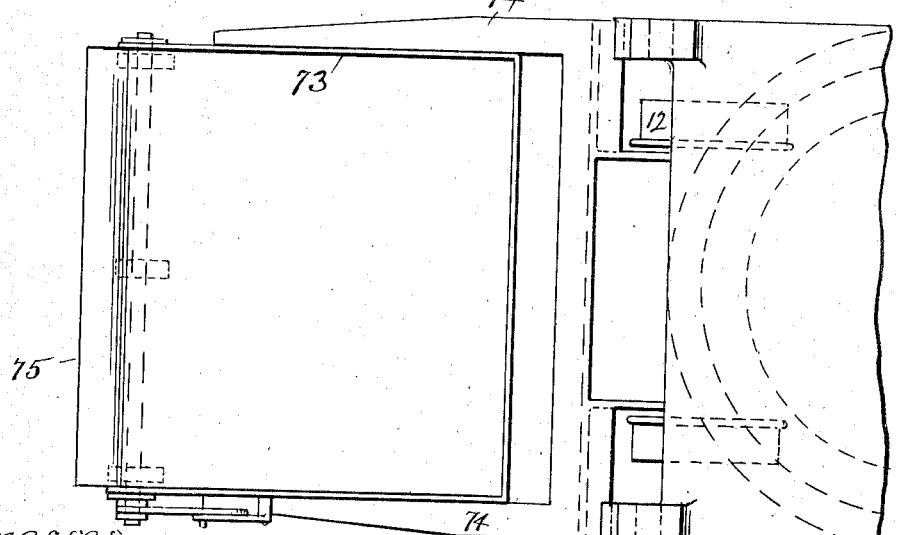

UNITED STATES PATENT OFFICE.

FRANK BILLINGS, OF CLEVELAND, OHIO.

LOADING AND CONVEYING APPARATUS.

1,300,111.        Specification of Letters Patent.        Patented Apr. 8, 1919.

Application filed June 12, 1913. Serial No. 773,173.

*To all whom it may concern:*

Be it known that I, FRANK BILLINGS, a citizen of the United States, residing at Cleveland, in the county of Cuyahoga and State of Ohio, have invented a certain new and useful Improvement in Loading and Conveying Apparatus, of which the following is a full, clear, and exact description.

This invention relates to a loading and conveying apparatus, and is an improvement over the apparatus disclosed in my prior application, Serial No. 538,408, filed Jan. 17th, 1910, for mining and loading apparatus.

The principal object of the present invention is to provide a machine which can be employed under conditions not favorable to the use of the relatively large machine shown in my prior application. More particularly, the invention aims to provide a machine which is adapted for use in mines for loading loose material at the breast of the mine and for conveying the same to a suitable point at which the material may be discharged, and which is especially adapted for use in rather close quarters, such as a sub-level which is too small to conveniently accommodate a machine embodying the principle of operation disclosed in my prior application.

The machine constructed in accordance with the preferred form of the present invention includes a suitable car adapted to be propelled by its own motive power, and provided at its forward end with a bucket or material receiving receptacle so disposed or constructed that material can be readily deposited into the same, and further, the machine includes a suitable operating or tool-holding member which may be provided with a material moving member such as a scraping hoe and is adapted to be given all the movements by which the equivalent operating member of my prior application is capable, so that material located in advance or at the side of the machine can be easily and rapidly loaded into the bucket. The bucket may be pivoted so that its forward end may drop to or adjacent the ground or floor of the mine, (in case the machine is used for mining purposes) and after it is filled with material, it may be swung upwardly and supported in a position such that the material cannot drop therefrom as the car is conveyed rearwardly to a point at which the contents is adapted to be dumped. The hoe or hoe housing which is capable of vertical tilting movement constitutes a very convenient means for rocking or tilting the bucket to a position for conveying purposes, and the hoe itself can be utilized for preventing any of the material dropping from the front end of the bucket as it is conveyed to the dumping point.

The bucket may be of the non-tilting type, in which event, the forward end is preferably provided with an inclined member serving as an apron to assist in loading and the bucket may be carried by the truck or framework of the machine, in which event it will not be capable of swinging movement, or if desired, it may be connected to the turntable of the machine so as to swing with the hoe, and so as to always have its axis in alinement with the hoe shank.

The above and numerous other features of construction and arrangement constitute my invention, which may be briefly summarized as consisting in certain novel details of construction and combinations and arrangements of parts which will be described in the specification, and set forth in the appended claims.

Figure 2:
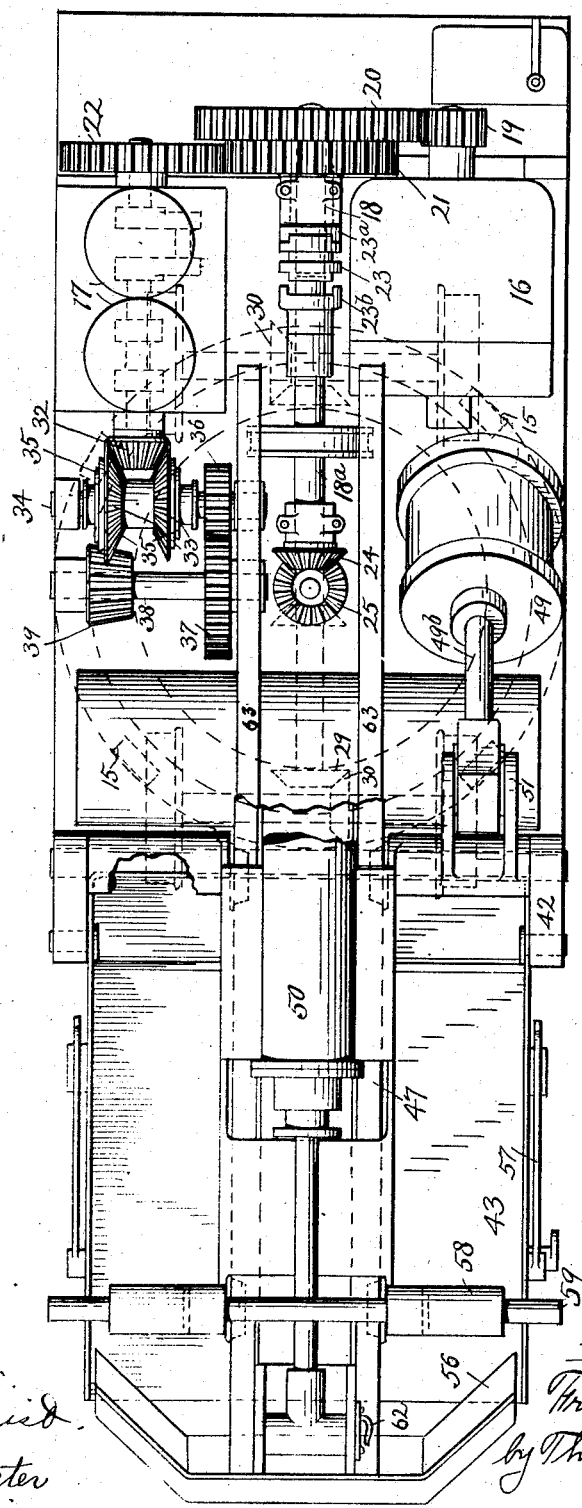
Figure 3:
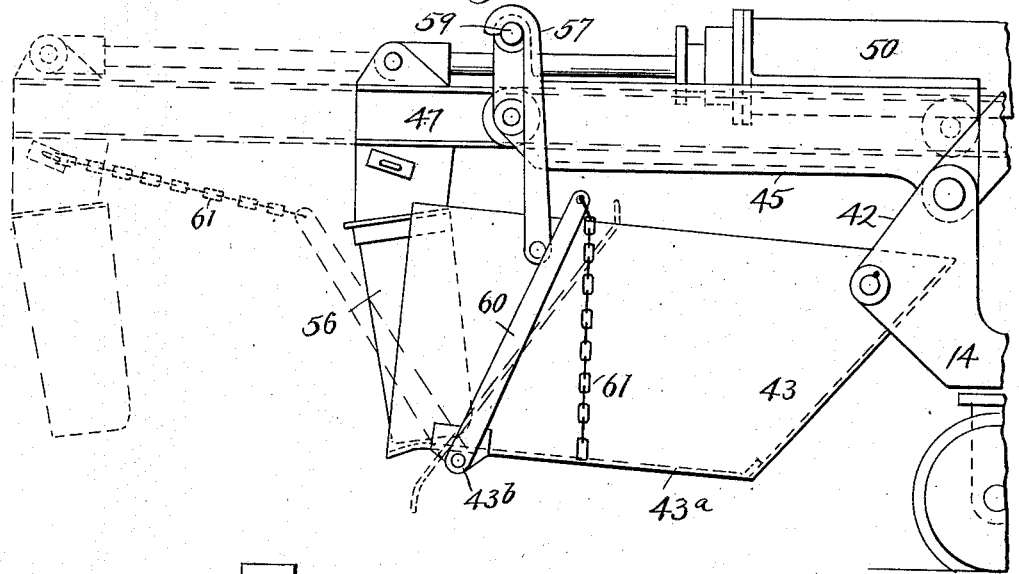
Figure 4:
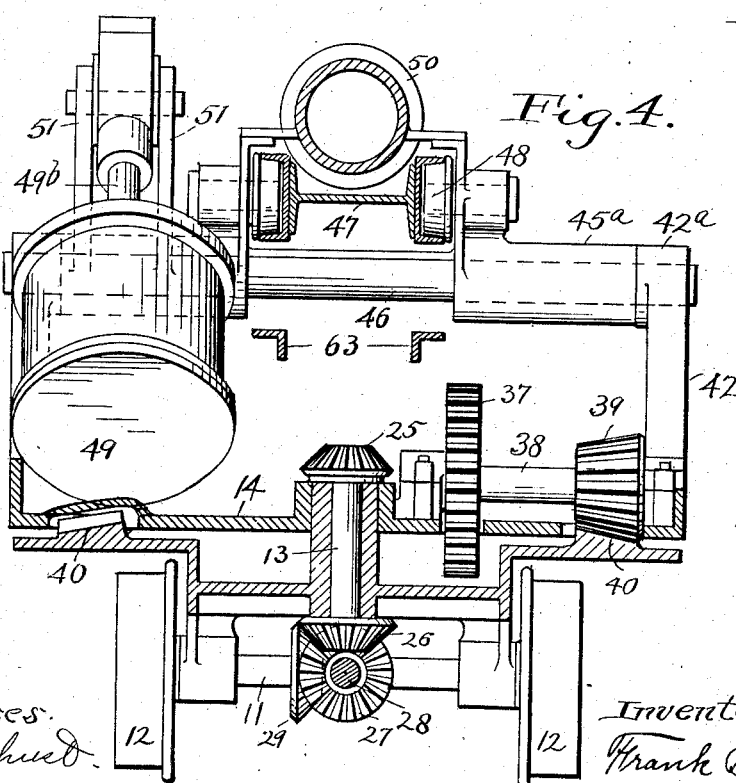
Figure 5:
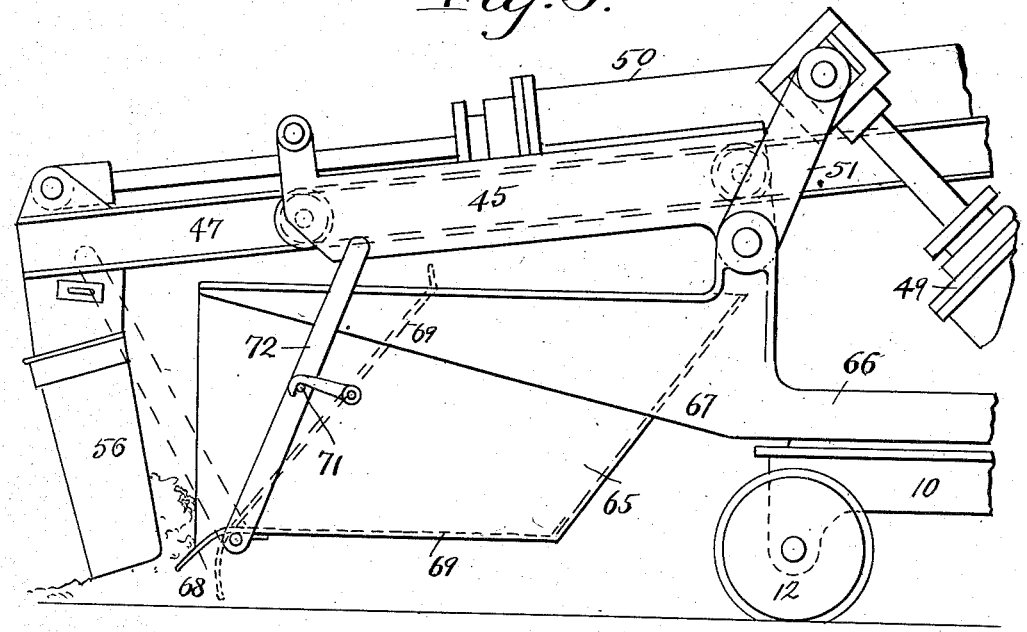
Figure 6:
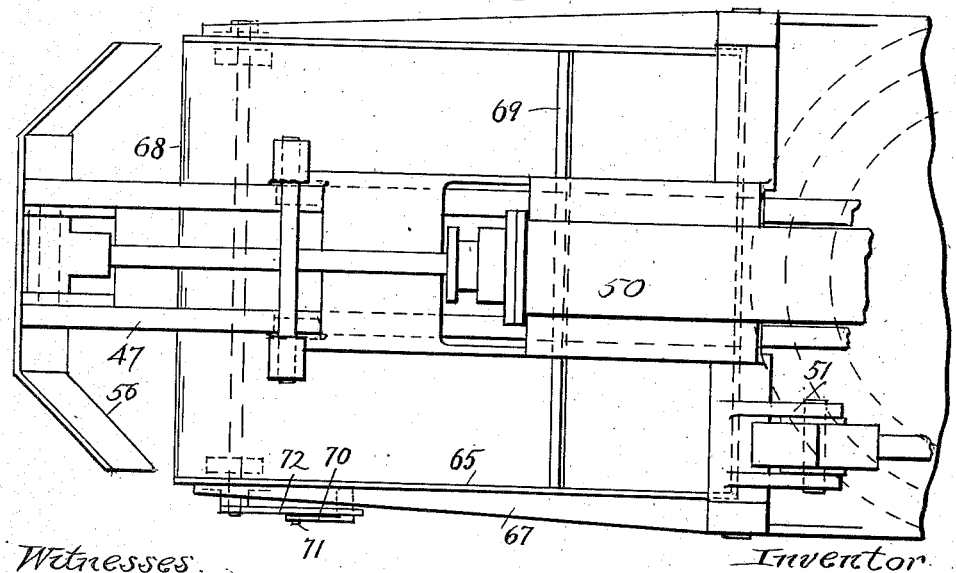

Referring now to the drawings wherein I have shown certain embodiments of my invention, Figure 1 is a side elevation of a preferred construction; Fig. 2 is a top plan view of the same with the parts broken away; Fig. 3 is a side view of the front part of the apparatus with the bucket elevated to a position suitable for holding and retaining the material when the car is moved rearwardly along the track to a dumping point; Fig. 4 is a transverse sectional view substantially along the line 4—4 of Fig. 1 looking forwardly; Fig. 5 is a side view of the front part of the apparatus showing a modification in the form of the bucket and its support; Fig. 6 is a top plan view of the same; Fig. 7 is a view similar to Fig. 5, showing a further modification; Fig. 8 is a top plan view of the same with the movable material scraping apparatus removed.

Referring now to the drawings, and particularly to Figs. 1 to 4, it will be seen that the apparatus includes a truck or body frame work 10 provided with axles 11 to which are secured track wheels 12, adapted to run along the track over which the apparatus is adapted to be moved back and forth between the point at which the material is loaded into the bucket and the point at which the material is dumped. As the work progresses, the track can be extended forwardly in a manner well understood.

Pivotally connected to the center of the truck 10 by means of a vertical shaft 13 which is suitably supported in an upright hub carried by the truck, is a horizontally movable turntable 14, provided with rollers 15 which engage a suitable track or flat top portion of the truck. This turn table, especially in the modification shown in Figs. 1 to 3, carries all the working or operating parts of the apparatus.

The apparatus is adapted to be propelled along the track and all working parts are adapted to be operated, either directly or indirectly by motive means consisting in this case of an electric motor 16, which is mounted on the rear end of the turn table. Also at the rear end of the turn table and on the opposite side of the center line of the latter from the motor is a double cylinder air compressor 17, which compresses air used in motors hereinafter explained.

Between the motor and air compressor are a pair of alined shafts 18 and 18ª. It will be observed that the shaft of the motor is provided at its rear end with a pinion 19 which meshes with the gear 20 on the rear end of the shaft 18. Just forward of this gear 20 and secured to a sleeve which is mounted on the shaft 18 is a gear 21 which meshes with a gear 22 on the air compressor shaft. A double-acting clutch member 23 which moves along the shafts 18 and 18ª cooperates with a pair of clutch members 23ª and 23ᵇ, one on the end of the sleeve to which the gear 21 is secured, and the other on the forward shaft 18ª. When the clutch member 23 is moved to the rear, or to the position shown in Fig. 2, the gear 21 is clutched to the shaft 18, and power is transmitted through the gears 19, 20, 21 and 22. When, however, the clutch member 23 is moved forwardly so as to engage the clutch member 23ᵇ, the gear 21 is disconnected from the shaft 18, and the two shafts 18 and 18ª are clutched together so that the latter will be driven by the motor through the gears 19 and 20 and the clutch.

When the clutch is in the position last named, the gear 21 is loose on the shaft 18, and the shaft 18ª can thence be driven by the motor to propel the car back and forth along the track. The power transmitting mechanism between the shaft 18ª and the driving axles of the car includes a bevel gear 24 on the forward end of the shaft 18ª, which bevel gear meshes with the bevel gear 25 at the upper end of the vertical pivotal shaft, which at its lower end is provided with a bevel gear 26, meshing with the bevel gear 27 on a lower horizontal shaft 28 provided at both ends with bevel gears 29 which mesh with bevel gears 30 on the axles.

In the preferred embodiment of the invention, the shaft of the air compressor is utilized also to operate gearing which turns the turn table in either direction. It will be observed that the air compressor shaft is provided at its forward end with a bevel gear 32 which engages a pair of bevel gears 33 which are normally loose upon a shaft 34 and which may be clutched to said shaft by cone clutches 35. The shaft 34 is provided with a gear 36 which meshes with a larger gear 37 mounted upon a shaft 38 provided with a bevel gear 39 which as will be observed from Fig. 4, meshes with a circular rack 40 carried by the truck, the truck being stationary, as far as rotary movement is concerned. When the pinion 39 is rotated,—the turn table and all parts supported thereby are turned about the axis of the vertical pivotal shaft 13. When one of the bevel gears 35 is clutched to the shaft, the turn table is turned in one direction and when the other gear is clutched to the shaft, the turn table is turned in the reverse direction.

It will be observed that the turn table is provided at its forward end or near its forward front corners with a pair of parallel upstanding plates or ears 42, between which is pivotally connected for tilting movement in a vertical plane a bucket or material receiving member 43. This receptacle is closed at its sides and rear end and is open at the top and front end. It is also provided with a tilting bottom 43ª, the rear end of which is adapted to tilt upwardly about a shaft 43ᵇ extending beneath the bucket near its forward end. It may be here stated that when the bucket is being loaded with material, the forward end of the bucket will be lowered to substantially the position shown in Fig. 1, and after the bucket is loaded, it is swung upwardly by means hereinafter referred to, to substantially the position shown in Fig. 3.

The material is loaded into the bucket by a tool-holding working member which may be provided with a material scraping hoe, as shown in the drawing, or with other material moving means such as a shovel, grab bucket, or other tools, such as picking and hammering tools. In the present case, this working member is of substantially the same construction, and has all the movements of the tool holding working member of my prior application previously referred to. In this instance, however, it has additional functions to be referred to presently. The tool holding or tool shank is mounted for reciprocating movement inwardly and outwardly in a housing 45 which is pivotally connected to the parallel ears or plates 42 for rocking movement vertically. The pivotal connection between the housing and the parts 42 is formed by a pivotal shaft 46 to which the lower rear end of the housing is rotatably connected, the shaft passing through suitable alined bosses 42ª and 45ª on the plates 42 and housing respectively, (see particularly Fig. 4). The tool shank 47 is supported for reciprocating movement through the housing by means of a plurality of rollers 48 which are carried on the inner side of the housing, and engage within suitable channels of the shank.

For rocking or tilting the tool shank and housing vertically, and for reciprocating the tool shank relatively to the housing, I employ two reciprocating air motors 49 and 50. The motor 49 includes a cylinder 49ª which is supported by the turn table in an inclined position, as shown in Fig. 1, and a piston, not shown, which is connected to a plunger 49ᵇ, which has a pivotal connection with the upper end of a pair of crank arms 51 which are integral with one of the bosses 45ª of the housing. The motor 50 includes a rather long cylinder 50ª which is carried by the housing 45 and a piston, not shown, which is connected to a plunger 50ᵇ which extends parallel to the tool shank 47 and at its front end is connected to the latter. Both motors 49 and 50 are adapted to be supplied with air from an air receiver 52 carried by the forward end of the turn table, which receiver is adapted to be connected in a suitable manner to the air compressors 17. By means of suitable valves, strokes of variable speed length and power can be imparted to the shank to reciprocate the same, or to rock the same about the pivotal axis of the housing. The operator's station or platform 53 is at the rear end of the turn table, and within convenient reach of the operator when on the platform is the electric controller 54 which controls the motor and other suitable operating parts which are required to control the air motors. These operating levers and other parts are not shown, to avoid unnecessary complications in the description and illustration.

As before stated, the shank or ram 47 is provided with a tool head 55 to which a variety of tools may be secured. In the drawings, the head is provided with a scraping hoe 56 which, as shown particularly in Fig. 2 is channel shaped in cross section, and has a span or width which is substantially equal to the width of the bucket into which the material is adapted to be scraped when the hoe is drawn rearwardly up to the mouth of the bucket. With this construction of hoe, a bucket having contents of about one cubic yard can be filled with a very few strokes of the hoe.

When the hoe moves the material rearwardly into the mouth or open front end of the bucket, not only is the hoe shank reciprocated, but the housing is rocked about its axis of movement, due to the fact that the angle of the hoe shank constantly changes, as the hoe moves inwardly toward the bucket. The construction and arrangement of parts are such that the hoe may move inwardly into the receptacle a suitable distance along the inclined bottom, so that the material will be moved well up toward the rear end of the receptacle.

In retracting the hoe through the medium of the motor 50 to scrape a quantity of material into the receptacle, not only is power applied to the hoe through the motor 50, but generally at the same time power will be applied to the housing by means of the motor 49, to force the hoe downwardly so that the hoe will effectively and cleanly scrape the material into the receptacle.

When the bucket is filled with material, the hoe 56 is moved inwardly so as to substantially close the front open end of the bucket, as shown in Fig. 1, and thence the front end of the bucket is elevated so that by the elevation and by reason of the location of the hoe, practically no material will drop from the bucket when it is transported rearwardly to the dumping point.

In order that the bucket may be elevated easily and be retained in elevated position, I provide on the sides of the bucket, a pair of hooks 57 by which operative connections can be made between the bucket and the housing to elevate the bucket. For this purpose, the housing is provided at its forward end with a pair of laterally projecting bosses 58 through which extends a shaft or stud 59, the ends of which project outwardly beyond the sides of the bucket and over which the hooks or arms 57 can be swung when the hoe and hoe shank are placed in position relative to the bucket shown in Fig. 1.

After the bucket is hooked to the housing in the manner just stated, by tilting the housing upwardly, the bucket is tilted upwardly to the position shown in Fig. 3, and thence the entire apparatus is in condition to be moved rearwardly to the dumping point, which may be the bin or chute leading from the sub-level of a mine to the level beneath.

To dump the contents of the bucket, I make use of the reciprocating ram. It will be observed that the shaft 43ᵇ about the axis of which the bottom 43ª is adapted to be tilted or rocked, is provided with an upwardly extending arm or lever 60. This lever is provided at its upper end with a chain or equivalent device 61 which is adapted to be connected to a hook 62 on the tool head 55. Thence to dump the contents of the bucket, it is only necessary for the operator to move the ram outwardly by its motor, whereupon the chain 61 and lever 60 tilt the bottom of the bucket to the position shown by dotted lines in Fig. 3. When the chain is unhooked from the tool head, the bottom will then drop to normal position, whereupon the machine can again be run forwardly to position to receive another load. Thus with this construction, the housing and tool shank or ram not only serve to load the bucket, but are utilized in elevating and dumping the bucket.

In order that the apparatus carried by the turn table may not be damaged by blows from the rear end of the hoe shank or ram when the forward end of the latter is elevated, the turn table is provided with a pair of curved angle guides 63, which limit the downward movement of the rear end of the ram and serve also to guide the ram when the forward end is elevated.

It will be understood without any further detailed description that the operator may swing the turn table and all parts connected thereto through any arc desired when the motor is unclutched from the transmission gearing which drives the car as a whole, so that material located at the sides of the axis of the machine can be reached and moved into the bucket. It will be seen also that the length of the motor 50 is such that the hoe has a considerable range of movement so that a very large mass of material can be collected and moved rearwardly without extending the tracks. At the same time, the construction is such that the material can be loaded into the bucket very rapidly and cleanly.

As before stated, I may employ either a tilting or non-tilting bucket and may utilize a bucket which will either turn with the turn table, or which is fixed relative to the turn table.

In the construction shown in Figs. 5 and 6, the bucket 65 projects forwardly from the turn table, and is fixed relatively thereto, the said turn table which is here designated 66 being provided with a pair of forwardly projecting arms or brackets 67 to which the bucket is rigidly secured. With this construction, the bucket is provided at its forward end with an upwardly and rearwardly inclined apron 68, which extends from a point adjacent the level from which the material is scraped or removed, in order that the material may be effectively moved up into the bucket. Any suitable form of apron may be employed, but as here shown, the apron is formed on the front end of the bottom 69 of the bucket. As in the first instance, the hoe may move up along the inclined part. With this construction, there is no means for elevating the bucket, as none are required, but the pivoted bucket bottom may be tilted to dump the contents in the same manner as before described.

In order that the bottom of the bucket or receptacle 65 will not be tilted, due to the pressure of material on the apron 68, when material is scraped into the bucket by the hoe, the bottom 69 is normally locked against tilting movement, and in this case this is accomplished by means of a latch 70 pivotally connected to the side of the bucket and adapted to hook over a pin 71 on the lever 72 which is connected to the shaft to which the bottom 69 is connected for tilting movement.

In Figs. 7 and 8, the bucket here designated 73 does not turn with the turn table, but is carried by the truck which in this instance is provided with a pair of forwardly projecting arms 74 to which the bucket is rigidly secured.

With this construction, wherein the turn table, the hoe and hoe shank turn relatively to the bucket, it is necessary that material which is located at the side of the machine be brought up to the mouth of the bucket by giving the hoe a combination of movements consisting of a rearward movement and a lateral movement. Both these movements can, however, be given to the hoe at the same time, by properly manipulating the motors.

With this construction, the front end of the bucket is provided with an inclined apron 75, as in the construction shown in Figs. 5 and 6. The remaining parts of the apparatus shown in Figs. 5 to 8, will be the same as in the construction shown in Figs. 1 to 4, and hence further detailed description is unnecessary, and the same reference characters and description given in connection with the preferred construction apply to the corresponding parts of the modified forms.

While I have shown only one form of material moving member, i. e., the scraping hoe, and while the hoe is the preferred tool for moving material to and into the bucket, I do not wish to be confined to the use of that tool for the reason that under certain circumstances, it may be desirable to equip the tool holding shank or ram with a material moving device of a slightly different character, such for example, as a shovel or bucket, which while capable generally of the movements which can be given to the hoe through the medium of the various motors, etc., can be dumped or tilted when moved inwardly to a position over the receptacle so as to deposit the material into the receptacle. Furthermore, I do not desire to be confined to the specific type of dumping receptacle or bucket here shown, as other forms of dumping receptacles may be provided, whether the same are of the bottom or side dumping type.

Having thus described my invention, what I claim is:

1. In a loading and conveying machine, a wheeled body adapted to travel along a track, a dumping receptacle supported at the forward end of the body and having its forward end adjacent the ground so that material on the ground may be moved rearwardly up into the receptacle, said receptacle being provided with inclosing walls which retain the material moved into the same, means whereby the material may be dumped from the receptacle, and means for filling the receptacle comprising a material moving member, supported by the body for inward and outward reciprocating movement and for swinging movement relative to the receptacle.

2. In a loading and conveying machine, a wheeled body, a dumping receptacle supported at the forward end of the body, said receptacle having a part which during the filling operation is adjacent the ground and inclines upwardly therefrom, said receptacle being provided with inclosing walls which retain the material moved into the same, means whereby the material may be dumped from the receptacle, and means for filling the receptacle comprising a hoe and hoe shank supported by the body for reciprocating movement inward and outward and for swinging movement relative to the receptacle, and motive means for shifting the hoe shank so as to move material up into the receptacle.

3. In a loading and conveying machine, a wheeled body, a dumping receptacle supported at the forward end of the body and having its forward end adjacent the ground during the loading operation, said receptacle being provided with inclosing walls which retain the material moved into the same, means whereby the material may be dumped from the receptacle, a turn table supported on the body, a hoe housing on the turn table, a reciprocating hoe shank supported in said housing and having a hoe at its forward end, and motive means for reciprocating and swinging the hoe shank relative to the receptacle.

4. In a loading and conveying machine, a wheeled body, a dumping receptacle at the forward end of the body, said receptacle being provided with inclosing walls which retain the material moved into the same, means whereby the material may be dumped from the receptacle, means for filling said receptacle comprising a hoe and hoe shank supported by the body for reciprocating and swinging movements relative to the receptacle, and means for operatively connecting a part of the filling mechanism with a part of the receptacle to dump the latter.

5. In a loading and conveying machine, a wheeled body, a dumping receptacle supported by the body and pivoted at its rear end so that its forward end may be lowered toward the ground, said receptacle being provided with inclosing walls which retain the material moved into the same, means whereby the material may be dumped from the receptacle, means for filling the receptacle comprising a hoe and hoe shank supported by the body for reciprocating and swinging movements relative to the receptacle, and means for connecting a part of the filling mechanism with the forward part of the receptacle to elevate the forward end of the receptacle.

6. In a loading and conveying machine, a wheeled body adapted to travel along a track, a dumping receptacle pivotally supported at the forward end of the body and adapted to normally have its forward end adjacent the ground so that material on the ground may be moved rearwardly into the receptacle, said receptacle being provided with inclosing walls which retain the material moved into the same, means whereby the material may be dumped from the receptacle, and means coöperating with said receptacle for filling the receptacle with material, said means comprising a material moving member supported at the forward end of the body and adapted to have a reciprocating movement and for a swinging movement relative to the receptacle.

7. In a loading and conveying machine, a wheeled body adapted to travel along the track, a dumping receptacle pivotally supported at the forward end of the body and adapted to have its forward end adjacent the ground so that material on the ground may be moved rearwardly into the receptacle, means for supporting the forward end of the receptacle when the receptacle has been filled with material, and means for filling the receptacle comprising a material moving member supported by the body for inward and outward reciprocating movement and for swinging movement relative to the receptacle.

In testimony whereof, I hereunto affix my signature in the presence of two witnesses.

FRANK BILLINGS.

Witnesses:
L. I. PORTER,
A. F. KWIS.